United States Patent

Sukekawa

[11] Patent Number: 5,969,888
[45] Date of Patent: Oct. 19, 1999

[54] OPTICAL UNIT COUPLING MECHANISM

[75] Inventor: Minoru Sukekawa, Hachioji, Japan

[73] Assignee: Olympus Optical Co., Ltd., Japan

[21] Appl. No.: 08/916,053

[22] Filed: Aug. 21, 1997

[30]    Foreign Application Priority Data

Aug. 23, 1996  [JP]  Japan .................................. 8-222328

[51] Int. Cl.⁶ ............................ G02B 7/02; G02B 21/20; G02B 21/18; B25G 3/08
[52] U.S. Cl. ........................ 359/821; 359/819; 359/377; 359/373; 359/372; 403/381
[58] Field of Search ..................... 359/368, 372, 359/373, 376, 377, 381, 390, 819, 821, 827; 396/322, 324, 325, 326, 327, 328, 332, 333, 334, 529, 531, 432; 403/381

[56]              References Cited

U.S. PATENT DOCUMENTS 5,337,177  8/1994  Toyoda et al. ........................... 359/384

FOREIGN PATENT DOCUMENTS 60-110814  7/1985  Japan .
1-164401  11/1989  Japan .

OTHER PUBLICATIONS

Merriam Webster's Collegiate Dictionary, Merriam-Webster, Incorporated, p. 348, Jan. 1997.

*Primary Examiner*—Cassandra Spyrou
*Assistant Examiner*—Jennifer Winstedt
*Attorney, Agent, or Firm*—Ostrolenk, Faber, Gerg & Soffen, LLP

[57]              ABSTRACT

An optical unit coupling mechanism for coupling optical units 10, 11 having a plurality of mutually parallel optical paths 10a, 10b with each other, said optical unit coupling mechanism comprising a round dovetail consisting of a male dovetail 1 and a female dovetail 4, wherein said male dovetail 1 has a minor diameter part 1b of predetermined diameter $d_2$, part 1d of which is sized larger than the diameter $d_2$ of the minor diameter part 1b. By virtue of this optical unit coupling mechanism, the system performance can be enhanced without causing a system enlargement and the system compatibility can be maintained.

17 Claims, 7 Drawing Sheets

OPTICAL UNIT COUPLING MECHANISM

BACKGROUND OF THE INVENTION

1. Field of The Invention

The present invention relates to an optical unit coupling mechanism for coupling optical units having a plurality of mutually parallel optical paths with each other, in which use is made of a round dovetail.

2. Discussion of Related Art

The above type of optical unit coupling mechanism is commonly employed as means for coupling, for example, individual units of a stereomicroscope as shown in FIG. 11 with each other. In this stereomicroscope, the optical system is now constructed by interposing various units known as intermediate tubes (or intermediate lens barrels), for example, a photographic tube (or photographic lens barrel) 103 and a coaxial falling light illuminator 104 between a zoom lens body 101 and a binocular observation tube (or binocular lens barrel) 102 in order to comply with the user needs diversified year after year. The mechanism for coupling an intermediate tube with the zoom lens body 101, mechanism for coupling the intermediate tubes with each other and mechanism for coupling an intermediate tube with the binocular observation tube 102 generally each comprise the round dovetail disclosed as prior art in Japanese Utility Model Laid-Open No. 11084/1985. Further, Japanese Utility Model Laid-Open No. 164401/1989 discloses a stereomicroscope in which use is made of a combination of prisms and includes a drawing showing the formation of the round dovetail at a lower part of a binocular observation tube through which a pair of light beams pass.

However, the above common optical unit coupling mechanism for achieving coupling of the individual optical units with the use of the round dovetail according to the prior art has involved the following problem. In stereomicroscopes, as mentioned above, the optical system is often constructed by piling two or three intermediate tubes in order to comply with the diversified user needs. In this optical system, the effective diameter of each tube must be satisfactorily large for observing the entire visual field without the occurrence of eclipse, shading or other problem. Further, the effective diameter of the light beam must be large for increasing NA and enlarging the visual field in order to enable performance enhancement.

In the round dovetail disclosed in Japanese Utility Model Laid-Open No. 164401/1989, as shown in FIGS. 12 and 13, the structure thereof is such that fastening is effected by pressing a slant face 111 of the round dovetail. Thus, the diameter $d_{11}$ of a minor diameter part 112 forming an abutting joint face is conspicuously small relative to the diameter $d_{12}$ of a major diameter part 113 of the round dovetail with the result that the effective diameter $d_{13}$ of the light beam is limited by the above diameter $d_{11}$ of the minor diameter part 112 forming an abutting joint face. If it is intended to render the effective diameter $d_{13}$ of the light beam larger than the diameter $d_{11}$ of the minor diameter part 112, either the dovetail per se must be enlarged or the spacing between the right optical axis and the left optical axis must be reduced. However, enlarging the dovetail per se leads to an apparatus enlargement. Further, the spacing between the right optical axis and the left optical axis is nearly entirely determined by the internal angle of the right and left optical axes on an object side, the NA and the size of the apparatus per se, which generally ranges from 22 to 24 mm in Galilean stereomicroscopes, and changing the above spacing is difficult. Still further, the size of the dovetail and the spacing between the optical axes often cannot be changed at all for ensuring a system compatibility.

SUMMARY OF THE INVENTION

The present invention has been made for overcoming the above problems of the prior art. Thus, it is an object of the present invention to provide an optical unit coupling mechanism which enables enhancing the performance of an optical system without causing an apparatus enlargement and enables maintaining a system compatibility.

The foregoing and other objects, features and advantages of the present invention will become apparent from the following detailed description and appended claims taken in connection with the accompanying drawings.

DETAILED DESCRIPTION OF THE INVENTION

Figure 1:
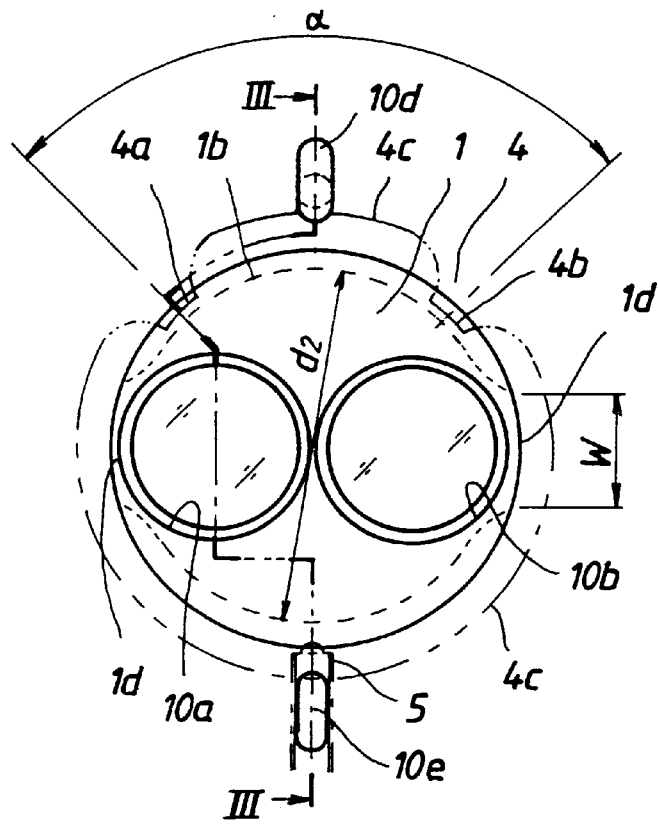
FIG. 1 is a bottom view of a round dovetail part of a binocular observation tube of a stereomicroscope according to Embodiment 1 of the present invention.

According to the present invention, there is provided an optical unit coupling mechanism for coupling optical units having a plurality of mutually parallel optical paths, the optical unit coupling mechanism comprising a round dovetail consisting of a male dovetail and a female dovetail, wherein: the male dovetail has a minor diameter part of predetermined diameter and is furnished with a plurality of protrudent parts, each of the protrudent parts defined as portion of the minor diameter part sized larger than the diameter of the minor diameter part, the number of the protrudent parts identical with the number of the mutually parallel optical paths, each of the mutually parallel optical paths arranged so as to correspond to respective one of the protrudent parts.

In the present invention, the optical units having a plurality of mutually parallel optical paths with each other are, for example, units of a stereomicroscope, an endoscope, a rigidoscope or a videomicroscope.

Further, the optical unit coupling mechanism of the present invention is applied to, for example, coupling of a binocular observation tube with a zoom lens body, coupling of a zoom lens body with an intermediate tube, coupling of intermediate tubes with each other or coupling of an intermediate tube with a binocular observation tube.

With respect to the function of the present invention, by virtue of the male dovetail having a minor diameter part of predetermined diameter, part of which is sized larger than the diameter of the minor diameter part, an optical system in which the effective diameter of a light beam passing through a plurality of mutually parallel optical axes is enlarged can be arranged in the above part sized larger than the diameter of the minor diameter part of the male dovetail.

In the optical unit coupling mechanism, it is preferred that protrudent parts sized larger than the diameter of the minor diameter part of the male dovetail be provided in the same number as that of the plurality of mutually parallel optical paths and that the plurality of mutually parallel optical paths be arranged so as to correspond to respective protrudent parts.

The above protrudent parts sized larger than the diameter of the minor diameter part of the male dovetail may have substantially the same periphery as that of a major diameter part of the male dovetail.

The protrudent parts sized larger than the diameter of the minor diameter part of the male dovetail preferably have a width (W) satisfying the relationship:

$$0.5d \leq W \leq 1.5d$$

wherein d represents an inside diameter of the plurality of mutually parallel optical paths.

In the optical unit coupling mechanism, two protrudent parts sized larger than the diameter of the minor diameter part of the male dovetail may be present together with two mutually parallel optical paths.

Further, in the optical unit coupling mechanism, there may be boundaries between the minor diameter part and the protrudent parts of the male dovetail, the boundaries being formed so as to abut respective sides of corresponding projecting parts of the female dovetail.

Still further, in the optical unit coupling mechanism, means may be provided for positioning in a direction of rotation about a center axis of the round dovetail.

The above positioning means may comprise a pair of pin and fitting hole provided in mutually corresponding relationship in the female dovetail and the male dovetail.

Also, the positioning means may comprise a side of a projecting part of the female dovetail and boundaries between the minor diameter part of the male dovetail formed so as to abut said side and the protrudent parts sized larger than the diameter of the minor diameter part.

In the optical unit coupling mechanism, three protrudent parts sized larger than the diameter of the minor diameter part of the male dovetail may be present together with three mutually parallel optical paths.

According to another aspect of the present invention, there is provided a stereomicroscope having two mutually parallel optical paths, wherein optical units are coupled with each other at at least one point by means of a round dovetail consisting of a male dovetail and a female dovetail, and wherein said male dovetail has a minor diameter part of predetermined diameter, at least two points of which are sized larger than the diameter of the minor diameter part, the two optical paths being arranged so as to correspond to respective larger sized protrudent parts.

In the stereomicroscope, the optical units coupled with each other by means of the round dovetail may be a zoom lens body and a binocular observation tube; a zoom lens body and an intermediate tube; intermediate tubes different from each other; or a intermediate tube and a binocular observation tube.

EFFECT OF THE INVENTION

In the present invention, an optical unit coupling mechanism which enables enhancing a system performance without causing an apparatus enlargement and enables maintaining a system compatibility can be provided by arranging an optical system including a light beam of enlarged effective diameter passing along a plurality of mutually parallel optical axes in part sized larger than the diameter of a minor diameter part of a male dovetail.

PREFERRED EMBODIMENT OF THE INVENTION

The present invention will now be described in greater detail with reference to the following Embodiments, which should not be construed as limiting the scope of the invention.

Embodiment 1

Figure 2:
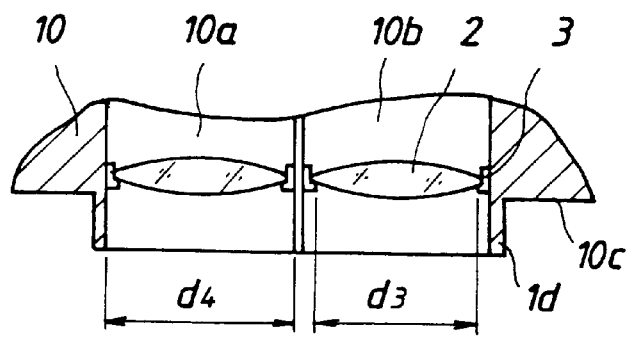
FIG. 2 is a partial frontal sectional view of a round dovetail part of a binocular observation tube of a stereomicroscope according to Embodiment 1 of the present invention.
Figure 3:
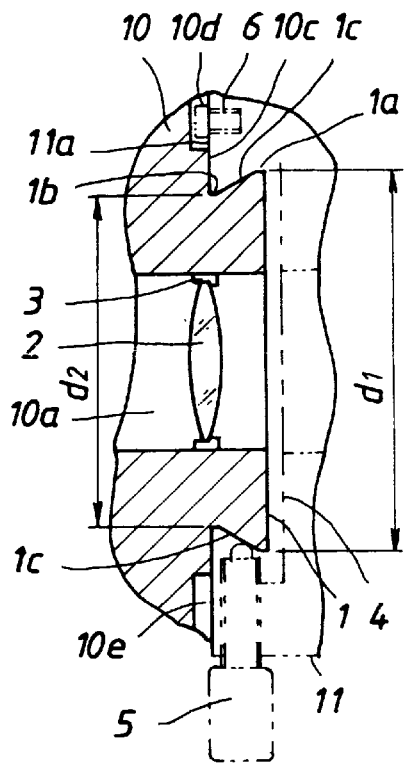
FIG. 3 is a section on the line III—III of FIG. 1 according to Embodiment 1 of the present invention.
Figure 4:
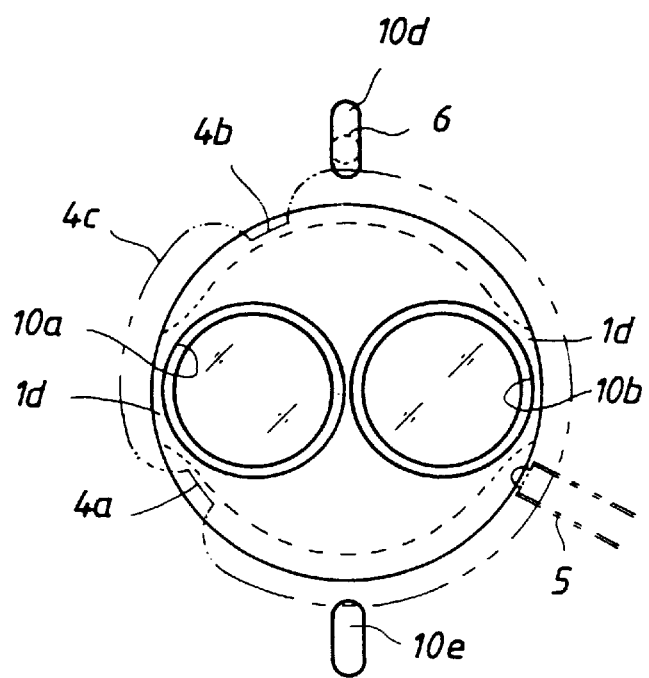
FIG. 4 is a bottom view of a modified form of round dovetail part of a binocular observation tube of a stereomicroscope according to Embodiment 1 of the present invention.

This Embodiment of the present invention will be described with reference to FIGS. 1 to 4 in which FIG. 1 is a bottom view of a round dovetail part of a binocular observation tube of a stereomicroscope according to Embodiment 1 of the present invention; FIG. 2 is a partial frontal sectional view of a round dovetail part of a binocular observation tube of a stereomicroscope according to Embodiment 1 of the present invention; FIG. 3 is a section on the line III—III of FIG. 1 according to Embodiment 1 of the present invention; and FIG. 4 is a bottom view of a modified form of round dovetail part of a binocular observation tube of a stereomicroscope according to Embodiment 1 of the present invention.

Referring now to FIGS. 1 to 3, a male dovetail 1 as one part of the round dovetail is formed at a lower part of a binocular observation tube 10 of a stereomicroscope. A pair of tube holes 10a, 10b are provided by perforation in mutually parallel relationship at positions which are symmetrical with respect to the center of the male dovetail 1 of the binocular observation tube 10 as an axis of symmetry. The tube holes 10a, 10b are fitted with respective image forming lenses 2 by means of a lens frame 3. The image forming lenses 2 form an optical system capable of creating an observed image, and the minimum inside diameter of the lens frame 3 is set so as to be identical with the effective diameter $d_3$ of the light beam. In the drawings, a zoom lens body 11 which is coupled with the binocular observation tube 10 is indicated by an alternate long and two short dashes line and, mainly, a female dovetail 4 as the other part of the round dovetail which is adapted to engage with the male dovetail 1 of the binocular observation tube 10 is shown in FIGS. 1 and 3. An abutting joint face 11a of the zoom lens body 11 abuts on an abutting joint face 10c of the binocular observation tube 10. The abutting joint face 10c of the binocular observation tube 10 is provided, by perforation, with a pair of long grooves 10d, 10e in which a pin 6 erected on the abutting joint face 11a of the zoom lens body 11 is fitted. The fitting of the pin 6 in one of the long grooves 10d, 10e restricts the position of the round dovetail along the circumferential direction, thereby attaining fixing of the same.

Referring to FIGS. 1 and 2, protrudent parts 1d which extensively protrude beyond the diameter $d_2$ of a minor diameter part 1b of the male dovetail 1 are formed at two positions of a slant face part 1c of the male dovetail 1 in order to insure a bulkhead from the inside diameters $d_4$ of the tube holes 10a, 10b. The periphery of each of the protrudent parts 1d is set so as to be identical with the diameter $d_1$ of a major diameter part 1a of the male dovetail 1. For optimum results, the width W of the protrudent part 1d is set so as to satisfy the relationship:

$$0.5d_4 \leq W \leq 1.5d_4$$

wherein $d_4$ represents the inside diameter of the tube hole 10a, 10b. The part of the male dovetail 1 other than the protrudent parts 1d is in the form of a slant face 1c tapered between the major diameter part 1a and the minor diameter part 1b as in the round dovetail of the prior art.

The zoom lens body 11 is provided with the female dovetail 4. The round dovetail is formed only at abutment parts 4a, 4b of the zoom lens body 11, and a run off 4c having the shape of a circular arc is formed at other parts of the zoom lens body 11. The abutment parts 4a, 4b are arranged at positions which are symmetrical with respect to the pin 6 fitted in the pair of long grooves 10d, 10e. For optimum results, the angle α of the abutment parts 4a, 4b is set so as to satisfy the relationship:

$$90° \leq \alpha \leq 120°.$$

A female screw is perforated in a face opposite to the abutment parts 4a, 4b, and a fixing screw 5 is threadedly engaged therewith. The tip of the fixing screw 5 presses the slant face part 1c of the male dovetail 1, so that the opposite slant face part 1c abuts on the abutment parts 4a, 4b of the female dovetail 4. As a result, the abutting joint face 10c of the binocular observation tube 10 is tightly secured to the abutting joint face 11a of the zoom lens body 11.

Now, the function of Embodiment 1 of the present invention will be described. The zoom lens body 11 is coupled with the binocular observation tube 10 by loosening the fixing screw 5 threadedly engaging with the zoom lens body 11, dropping the male dovetail 1 into the female dovetail 4 so that the pin 6 threadedly secured to the abutting joint face 11a is fitted in the long groove 10d perforated in the abutting joint face 10c of the binocular observation tube 10 and driving the fixing screw 5. The binocular observation tube 10 can be coupled in a reverse direction with the zoom lens body 11 by mounting the binocular observation tube 10 on the zoom lens body 11 so that the pin 6 is fitted in the long groove 10e. The above coupling procedure is the same as conducted in the prior art with the round dovetail employed in stereomicroscopes, and the abutment face of the dovetail is identical with that of the conventional round dovetail.

In Embodiment 1 of the present invention, by virtue of the provision of the male dovetail with the protrudent parts, the effective diameter of the light beam can be larger than in the use of the conventional round dovetail without having the inherent functions of the round dovetail impaired to thereby enable enhancing the system performance even if the diameter of the major diameter part of the binocular observation tube is identical with that of the prior art. Moreover, not only can the round dovetail be fixed strongly in high efficiency but also the effective diameter of the light beam can be maximized by setting the width W of the protrudent part of the male dovetail so as to satisfy the relationship:

$$0.5d_4 \leq W \leq 1.5d_4$$

and by setting the angle α of the abutment parts of the female dovetail so as to satisfy the relationship:

$$90° \leq \alpha \leq 120°.$$

Although the diameter of the protrudent part of the male dovetail is identical with that of the major diameter part in Embodiment 1 of the present invention, the diameter of the protrudent part is not limited thereto as long as it is larger than the diameter of the minor diameter part. The diameter of the protrudent part of the male dovetail can be set appropriate, depending on the spacing of optical axes and the inside diameter of the tube hole, and may be larger or smaller than the diameter of the major diameter part. However, the diameter of the protrudent part of the male dovetail must be in conformity with the range and size of the run off of the female dovetail. Moreover, the direction of the fixing of the round dovetail is not limited to that shown in FIGS. 1 to 3. As shown in FIG. 4, it can be changed as far as the protrudent part of the male dovetail is not abutted on.

Although the mechanism for coupling the binocular observation tube with the zoom lens body has been described in Embodiment 1 of the present invention, this mechanism can be applied to the coupling of the zoom lens body with an intermediate tube, the coupling of intermediate tubes with each other and the coupling of an intermediate tube with the binocular observation tube. Further, although the above coupling mechanism has been described with respect to a stereomicroscope as an example, it can be applied to other optical devices having a plurality of optical paths, such as an endoscope, a rigidoscope and a videomicroscope. In such applications as well, similar functions and effects can be realized.

Embodiment 2

Figure 5:
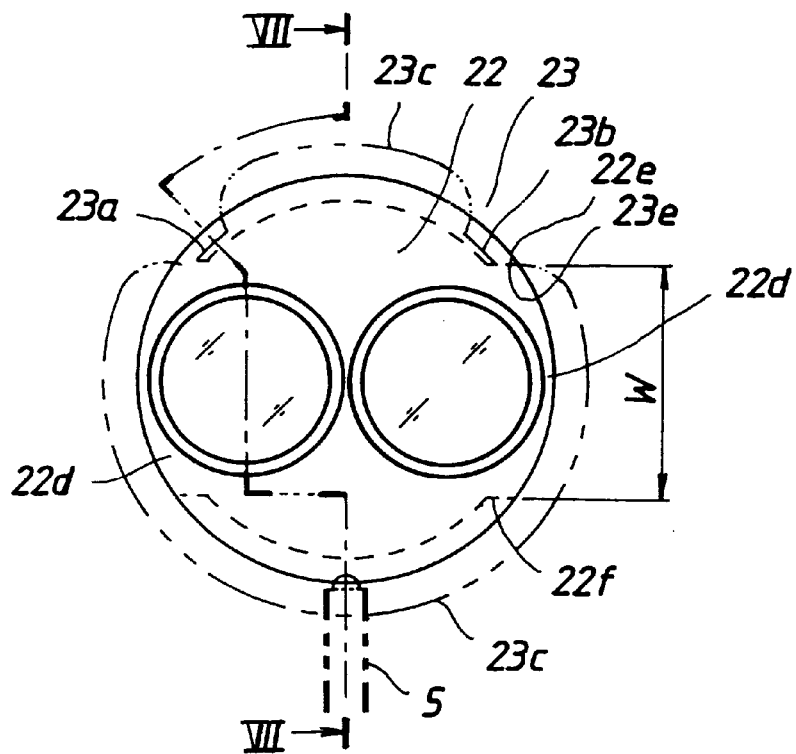
FIG. 5 is a bottom view of a round dovetail part of a binocular observation tube of a stereomicroscope according to Embodiment 2 of the present invention.
Figure 6:
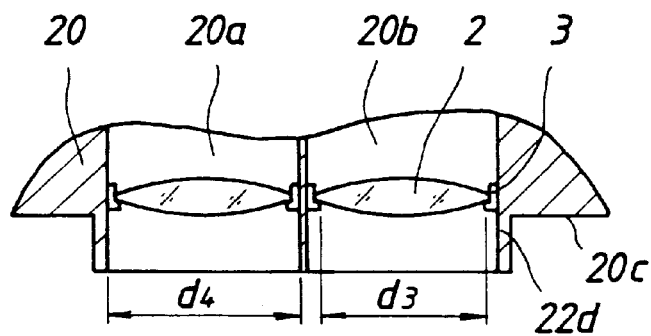
FIG. 6 is a partial frontal sectional view of a round dovetail part of a binocular observation tube of a stereomicroscope according to Embodiment 2 of the present invention.

This Embodiment of the present invention will be described with reference to FIGS. 5 to 7 in which FIG. 5 is a bottom view of a round dovetail part of a binocular observation tube of a stereomicroscope according to Embodiment 2 of the present invention; FIG. 6 is a partial frontal sectional view of a round dovetail part of a binocular observation tube of a stereomicroscope according to Embodiment 2 of the present invention; and FIG. 7 is a section on the line VII—VII of FIG. 5 according to Embodiment 2 of the present invention.

Figure 7:
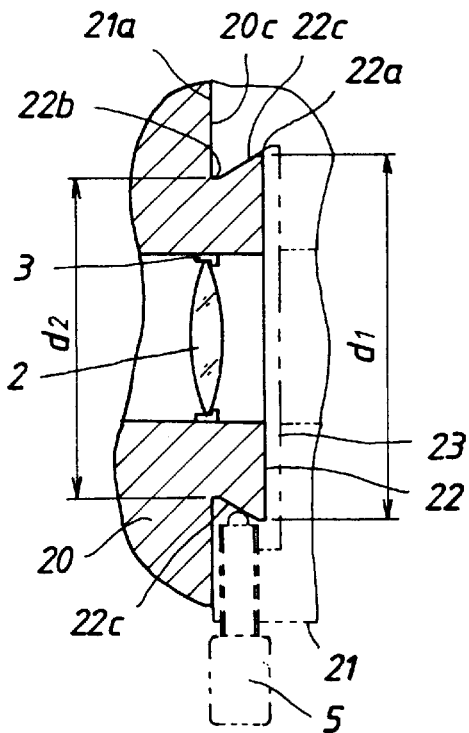
FIG. 7 is a section on the line VII—VII of FIG. 5 according to Embodiment 2 of the present invention.

Referring now to FIGS. 5 to 7, a male dovetail 22 as one part of the round dovetail is formed at a lower part of a binocular observation tube 20 of a stereomicroscope. A pair of tube holes 20a, 20b are provided by perforation in mutually parallel relationship at positions which are symmetrical with respect to the center of the male dovetail 22 of the binocular observation tube 20 as an axis of symmetry. The tube holes 20a, 20b are fitted with respective image forming lenses 2 by means of a lens frame 3. The image forming lenses 2 form an optical system capable of creating an observed image, and the minimum inside diameter of the lens frame 3 is set so as to be identical with the effective diameter $d_3$ of the light beam. In the drawings, a zoom lens body 21 which is coupled with the binocular observation tube 20 is indicated by an alternate long and two short dashes line and, mainly, a female dovetail 23 as the other part of the round dovetail which is adapted to engage with the male dovetail 22 of the binocular observation tube 20 is shown in FIGS. 5 and 7.

Referring to FIGS. 5 and 6, protrudent parts 22d which extensively protrude beyond the diameter $d_2$ of a minor diameter part 22b of the male dovetail 22 are formed at two positions of a slant face part 22c of the male dovetail 22 in order to insure a bulkhead from the inside diameters $d_4$ of the tube holes 20a, 20b. The periphery of each of the protrudent parts 22d is set so as to be identical with the diameter $d_1$ of a major diameter part 22a of the male dovetail 22. The width W of the protrudent part 22d is set so as to satisfy the relationship:

$$1.2 d_4 \leq W$$

wherein $d_4$ represents the inside diameter of the tube hole 20a, 20b. Both sides 22e, 22f of the width W are so formed as to be parallel to the line linking the respective optical axes of the tube holes 20a, 20b with each other. The part of the male dovetail 20 other than the protrudent parts 22d is in the form of a slant face 22c tapered between the major diameter part 22a and the minor diameter part 22b as in the round dovetail of the prior art.

The zoom lens body 21 is provided with the female dovetail 23. The round dovetail is formed only at abutment parts 23a, 23b of the zoom lens body 21, and a run off 23c having the shape of a circular arc is formed at other parts of the zoom lens body 21. The abutment part 23a, 23b is arranged at a position on which one side 22e of the width W of the protrudent part 22d of the binocular observation tube 20 abuts, and its abutment side 23e is formed linearly so as to match the side 22e of the protrudent part 22d of the binocular observation tube 20. A female screw is perforated in a face opposite to the abutment parts 23a, 23b, and a fixing screw 5 is threadedly engaged therewith. The tip of the fixing screw 5 presses the slant face part 22c of the male dovetail 22, so that the opposite slant face part 22c abuts on the abutment parts 23a, 23b of the female dovetail 23. As a result, the abutting joint face 20c of the binocular observation tube 20 is tightly secured to the abutting joint face 21a of the zoom lens body 21.

Now, the function of Embodiment 2 of the present invention will be described. The zoom lens body 21 is coupled with the binocular observation tube 20 by loosening the fixing screw 5 threadedly engaging with the zoom lens body 21, dropping the male dovetail 22 into the female dovetail 23 so that the one side 22e of the width W of the protrudent part 22d of the binocular observation tube 20 matches the abutment side 23e of the abutment parts 23a, 23b and driving the fixing screw 5. The binocular observation tube 20 can be coupled in a reverse direction with the zoom lens body 21 by mounting the binocular observation tube 20 on the zoom lens body 21 so that the other side 22f of the width W of the protrudent part 22d of the binocular observation tube 20 matches the abutment side 23e of the abutment parts 23a, 23b. The above coupling procedure is the same as conducted in the prior art with the round dovetail employed in stereomicroscopes, and the abutment face of the dovetail is identical with that of the conventional round dovetail.

In Embodiment 2 of the present invention, by virtue of the provision of the male dovetail with the protrudent parts, the effective diameter of the light beam can be larger than in the use of the conventional round dovetail without having the inherent functions of the round dovetail impaired to thereby enable enhancing the system performance even if the diameter of the major diameter part of the binocular observation tube is identical with that of the prior art. Moreover, the position in the direction of rotation is determined by the abutment part of the female dovetail and the side of the protrudent part of the male dovetail, so that, for example, no positioning pin is required to thereby enable providing an inexpensive coupling mechanism.

Although the diameter of the protrudent part of the male dovetail is identical with that of the major diameter part in Embodiment 2 of the present invention, the diameter of the protrudent part is not limited thereto as long as it is larger than the diameter of the minor diameter part. The diameter of the protrudent part of the male dovetail can be set appropriate, depending on the spacing of optical axes and the inside diameter of the tube hole, and may be larger or smaller than the diameter of the major diameter part. However, the diameter of the protrudent part of the male dovetail must be in conformity with the range and size of the run off of the female dovetail. Moreover, although the mechanism for coupling the binocular observation tube with the zoom lens body has been described in Embodiment 2 of the present invention, this mechanism can be applied to the coupling of the zoom lens body with an intermediate tube, the coupling of intermediate tubes with each other and the coupling of an intermediate tube with the binocular observation tube. Further, although the above coupling mechanism has been described with respect to a stereomicroscope as an example, it can be applied to other optical devices having a plurality of optical paths, such as an endoscope, a rigidoscope and a videomicroscope. In such applications as well, similar functions and effects can be realized.

Embodiment 3

Figure 8:
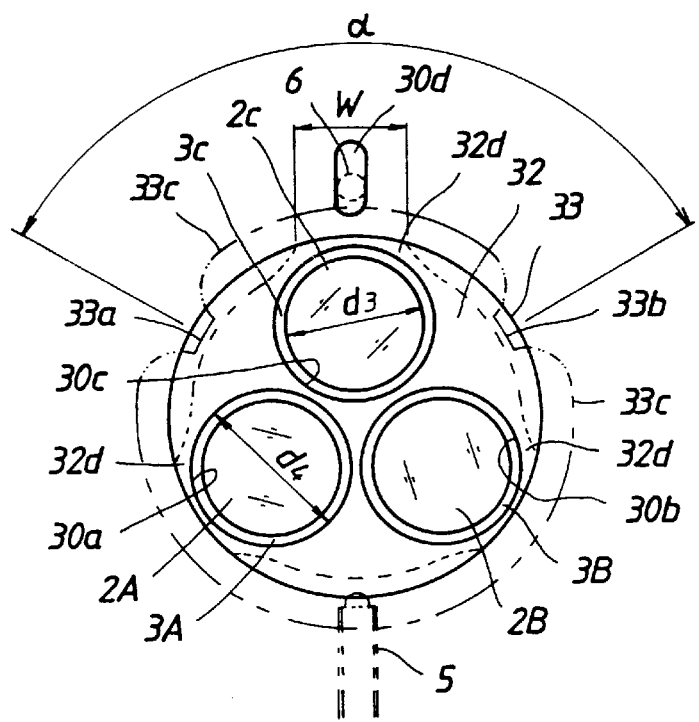
FIG. 8 is a bottom view of a round dovetail part of a binocular observation tube of a stereomicroscope according to Embodiment 3 of the present invention.
Figure 9:
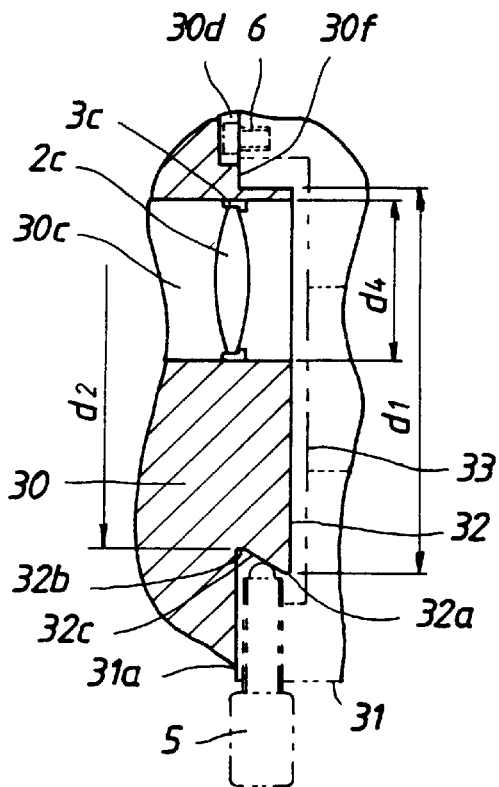
FIG. 9 is a side sectional view of a round dovetail part of a binocular observation tube of a stereomicroscope according to Embodiment 3 of the present invention.
Figure 10:
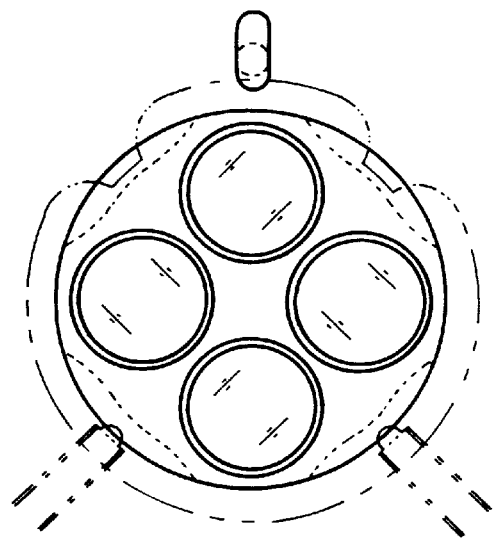
FIG. 10 is a bottom view of a modified form of round dovetail part of a binocular observation tube of a stereomicroscope according to Embodiment 3 of the present invention.
Figure 11:
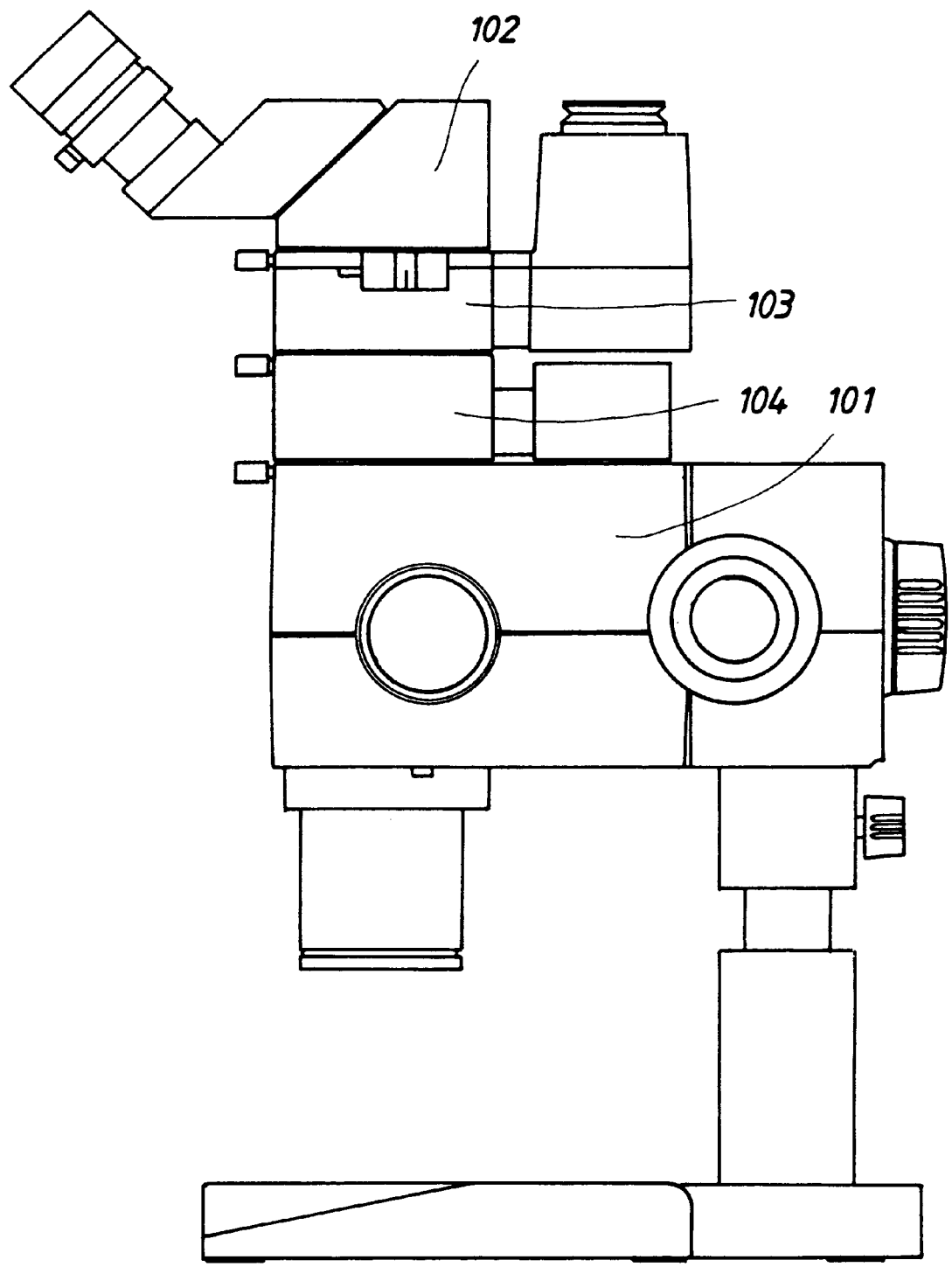
FIG. 11 is a side view of a stereomicroscope according to the prior art.
Figure 12:
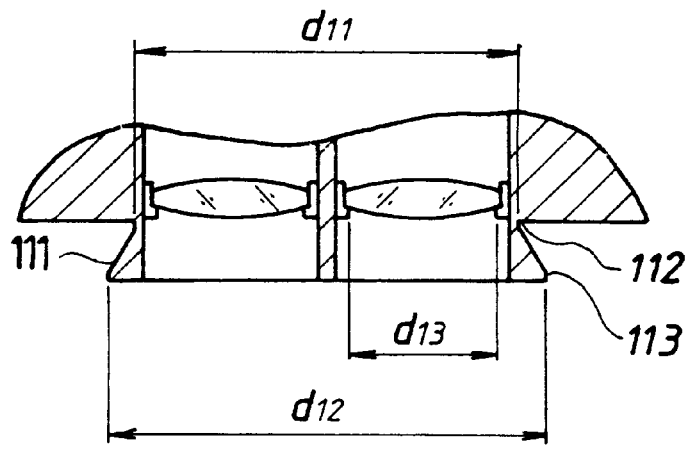
FIG. 12 is a longitudinal sectional view of a round dovetail of a binocular observation tube of a stereomicroscope according to the prior art.
Figure 13:
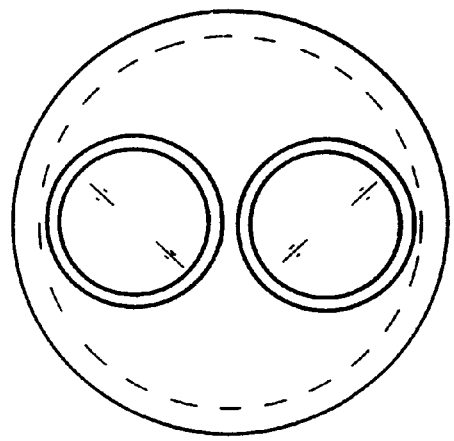
FIG. 13 is a bottom view of a round dovetail of a binocular observation tube of a stereomicroscope according to the prior art.

This Embodiment of the present invention will be described with reference to FIGS. 8 to 10 in which FIG. 8 is a bottom view of a round dovetail part of a binocular observation tube of a stereomicroscope according to Embodiment 3 of the present invention; FIG. 9 is a side sectional view of a round dovetail part of a binocular observation tube of a stereomicroscope according to Embodiment 3 of the present invention; and FIG. 10 is a bottom view of a modified form of round dovetail part of a binocular observation tube of a stereomicroscope according to Embodiment 3 of the present invention.

Referring now to FIGS. 8 and 9, a male dovetail 32 as one part of the round dovetail is formed at a lower part of a binocular observation tube 30 of a stereomicroscope. Three tube holes 30a, 30b, 30c are provided by perforation in mutually parallel relationship at positions trisecting a circumference whose axial center corresponds to the center of the male dovetail 32 of the binocular observation tube 30. The tube holes 30a, 30b are fitted with respective image forming lenses 2A, 2B by means of respective lens frames 3A, 3B, and the tube hole 30c is fitted with an image forming lens 2C by means of a lens frame 3C. The image forming lenses 2A, 2B form an optical system capable of creating an observed image, and the image forming lens 2C forms an optical system capable of creating an image for photographing. The minimum inside diameter of the lens frames 3A, 3B, 3C is set so as to be identical with the effective diameter $d_3$ of the light beam.

In the drawings, a zoom lens body 31 which is coupled with the binocular observation tube 30 is indicated by an alternate long and two short dashes line and, mainly, a female dovetail 33 as the other part of the round dovetail which is adapted to engage with the male dovetail 32 of the binocular observation tube 30 is shown therein. An abutting joint face 31a of the zoom lens body 31 abuts on an abutting joint face 30f of the binocular observation tube 30. The abutting joint face 30f of the binocular observation tube 30 is provided, by perforation, with a long groove 30d in which a pin 6 erected on the abutting joint face 31a of the zoom lens body 31 is fitted. The fitting of the pin 6 in the long groove 30d restricts the position of the round dovetail along the circumferential direction, thereby attaining fixing of the same.

Referring to FIGS. 8 and 9, protrudent parts 32d which extensively protrude beyond the diameter $d_2$ of a minor diameter part 32b of the male dovetail 32 are formed at three positions of a slant face part 32c of the male dovetail 32 in order to insure a bulkhead from the inside diameters $d_4$ of the tube holes 30a, 30b, 30c. The periphery of each of the protrudent parts 32d is set so as to be identical with the diameter $d_1$ of a major diameter part 32a of the male dovetail 32. For optimum results, the width W of the protrudent part 32d is set so as to satisfy the relationship:

$$0.5d_4 \leq W \leq 1.5d_4$$

wherein $d_4$ represents the inside diameter of the tube hole 30a, 30b, 30c. The part of the male dovetail 32 other than the protrudent parts 32d is in the form of a slant face 32c tapered between the major diameter part 32a and the minor diameter part 32b as in the round dovetail of the prior art.

The zoom lens body 31 is provided with the female dovetail 33. The round dovetail is formed only at abutment parts 33a, 33b of the zoom lens body 31, and a run off 33c having the shape of a circular arc is formed at other parts of the zoom lens body 31. The abutment parts 33a, 33b are arranged at positions which are symmetrical with respect to the pin 6 fitted in the long groove 30d. For optimum results, the angle α of the abutment parts 33a, 33b is set so as to satisfy the relationship:

$$90° \leq \alpha \leq 120°.$$

A female screw is perforated in a face opposite to the abutment parts 33a, 33b, and a fixing screw 5 is threadedly engaged therewith. The tip of the fixing screw 5 presses the slant face part 32c of the male dovetail 32, so that the opposite slant face part 32c abuts on the abutment parts 33a, 33b of the female dovetail 33. As a result, the abutting joint face 30f of the binocular observation tube 30 is tightly secured to the abutting joint face 31a of the zoom lens body 31.

Now, the function of Embodiment 3 of the present invention will be described. The zoom lens body 31 is coupled with the binocular observation tube 30 by loosening the fixing screw 5 threadedly engaging with the zoom lens body 31, dropping the male dovetail 32 into the female dovetail 33 so that the pin 6 threadedly secured to the abutting joint face 31a is fitted in the long groove 30d perforated in the abutting joint face 30f of the binocular observation tube 30 and driving the fixing screw 5. The above coupling procedure is the same as conducted in the prior art with the round dovetail employed in stereomicroscopes, and the abutment face of the dovetail is identical with that of the conventional round dovetail.

In Embodiment 3 of the present invention, by virtue of the provision of the male dovetail with the protrudent parts, the effective diameter of the light beam can be larger than in the use of the conventional round dovetail without having the inherent functions of the round dovetail impaired to thereby enable enhancing the system performance even if the diameter of the major diameter part of the binocular observation tube is identical with that of the prior art. Moreover, not only can the round dovetail be fixed strongly in high efficiency but also the effective diameter of the light beam can be maximized by setting the width W of the protrudent part of the male dovetail so as to satisfy the relationship:

$$0.5d_4 \leq W \leq 1.5d_4$$

and by setting the angle α of the abutment parts of the female dovetail so as to satisfy the relationship:

$$90° \leq \alpha \leq 120°.$$

Although the diameter of the protrudent part of the male dovetail is identical with that of the major diameter part in Embodiment 3 of the present invention, the diameter of the protrudent part is not limited thereto as long as it is larger than the diameter of the minor diameter part. The diameter of the protrudent part of the male dovetail can be set appropriate, depending on the spacing of optical axes and the inside diameter of the tube hole, and may be larger or smaller than the diameter of the major diameter part. However, the diameter of the protrudent part of the male dovetail must be in conformity with the range and size of the run off of the female dovetail. Moreover, although an example having three optical paths has been described in Embodiment 3 of the present invention, this mechanism can be applied to units having four optical paths as shown in FIG. 10. In such an application as well, similar functions and effects can be exerted. The above units have not only the optical path for observation through the binocular observation tube but also optical paths for photographing and lighting.

Furthermore, although the mechanism for coupling the binocular observation tube with the zoom lens body has been described in Embodiment 3 of the present invention, this mechanism can be applied to the coupling of the zoom lens body with an intermediate tube, the coupling of intermediate tubes with each other and the coupling of an intermediate tube with the binocular observation tube. Still further, although the above coupling mechanism has been described with respect to a stereomicroscope as an example, it can be applied to other optical devices having a plurality of optical paths, such as an endoscope, a rigidoscope and a video-microscope. In such applications as well, similar functions and effects can be realized.

What is claimed is:

1. An optical unit coupling mechanism for coupling optical units having a plurality of mutually parallel optical paths, said optical unit coupling mechanism comprising:

a round dovetail including a male dovetail and a female dovetail,
      wherein said male dovetail has a minor diameter, a major diameter, and a plurality of protrudent portions which are sized larger than the minor diameter,
      wherein the number of said protrudent portions is equal to the number of said mutually parallel optical paths, and
      wherein said protrudent portions are formed on said male dovetail such that each of said protrudent portions is aligned with a respective one of said mutually parallel optical paths.

2. The optical unit coupling mechanism according to claim 1, wherein said male dovetail and said female dovetail are formed on respective surfaces of two optical units so as to couple said two optical units, said two optical units being units of an apparatus selected from the group consisting of a stereomicroscope, an endoscope, a rigidoscope and a videomicroscope.

3. The optical unit coupling mechanism according to claim 1, wherein said male dovetail and said female dovetail couple together two optical units, said two optical units comprising at least one combination selected from the group consisting of a binocular observation tube with a zoom lens body, a zoom lens body with an intermediate tube, an intermediate tube with another intermediate tube, and an intermediate tube with a binocular observation tube.

4. The optical unit coupling mechanism according to claim 1, wherein the protrudent portions form a diameter which is substantially equal to the major diameter of the male dovetail.

5. The optical unit coupling mechanism according to claim 1, wherein each of the protrudent portions of the male dovetail has a width (W) satisfying the relationship:

$$0.5d \leq W \leq 1.5d,$$

wherein d represents an inside diameter of one of the plurality of mutually parallel optical paths.

6. The optical unit coupling mechanism according to claim 1, wherein the number of protrudent portions is two and the number of mutually parallel optical paths is also two.

7. The optical unit coupling mechanism according to claim 6, wherein said female dovetail includes an abutment having at least one abutment side and said protrudent portions of said male dovetail have abutment surfaces formed so as to abut said at least one abutment side of said abutment of the female dovetail.

8. The optical unit coupling mechanism according to claim 1, wherein said round dovetail further includes positioning means for positioning said female dovetail in a direction of rotation about a center axis of the round dovetail and with respect to said male dovetail.

9. The optical unit coupling mechanism according to claim 8, wherein the positioning means comprises a pair of pins and fitting holes provided, in mutually corresponding radial positions, in the female dovetail and the male dovetail, respectively.

10. The optical unit coupling mechanism according to claim 8, wherein the positioning means comprises an abutment formed on said female dovetail and having an abutment side, and sides of the protrudent portions formed so as to abut said side of said abutment of the female dovetail.

11. The optical unit coupling mechanism according to claim 1, wherein the number of said protrudent portions is three and the number of said mutually parallel optical paths is also three.

12. The optical unit coupling mechanism according to claim 1, wherein the number of said protrudent portions is four and the number of said mutually parallel optical paths is also four.

13. A stereomicroscope having a plurality of mutually parallel optical paths, comprising:

at least two optical units coupled to each other; and a round dovetail for coupling together said optical units, said round dovetail including a male dovetail and a female dovetail, wherein said male dovetail has a minor diameter, a major diameter, and at least two protrudent portions forming another diameter of said male dovetail which is larger than the minor diameter, wherein the number of said protrudent portions is the same as the number of said mutually parallel optical paths, and wherein said protrudent portions are formed on said male dovetail such that each of said protrudent portions is aligned with a respective one of said mutually parallel optical paths.

14. The stereomicroscope according to claim 13, wherein said optical units include a zoom lens body and a binocular observation tube.

15. The stereomicroscope according to claim 13, wherein said optical units include a zoom lens body and an intermediate tube.

16. The stereomicroscope according to claim 13, wherein said optical units include intermediate tubes different from each other.

17. The stereomicroscope according to claim 13, wherein said optical units include an intermediate tube and a binocular observation tube.

* * * * *